United States Patent [19]

Dudko et al.

[11] 4,332,997

[45] Jun. 1, 1982

[54] APPARATUS FOR DELIVERY OF VALVES AND MELTING RINGS TO AN INDUCTOR HEATER FOR HARD FACING

[76] Inventors: Daniil A. Dudko, ulitsa Anri Barbjusa, 22/26, kv. 113; Anatoly A. Mozzhukhin, ulitsa Grodnenskaya, 3/5, kv. 37; Vladimir P. Sotchenko, ulitsa P. Tychiny, 13, kv. 210; Boleslav I. Maximovich, ulitsa Anri Barbjusa, 22/26, kv. 107, all of Kiev, U.S.S.R.

[21] Appl. No.: 169,172

[22] Filed: Jul. 15, 1980

[51] Int. Cl.³ .................. H05B 6/14; B23K 37/04
[52] U.S. Cl. .................. 219/9.5; 219/10.57; 219/10.69; 228/6 R; 228/49 R; 29/786; 29/788; 193/47
[58] Field of Search .......... 219/10.57, 9.5, 10.67, 219/10.69, 10.71, 10.73, 10.41, 85 A, 85 G, 158, 159, 161; 228/4.1, 6 R, 47, 48, 49 R, 49 A, 212; 29/771, 786, 787, 788, 789, 790; 193/47; 198/402, 406; 118/409, 500, 620

[56] References Cited

U.S. PATENT DOCUMENTS

| | | | |
|---|---|---|---|
| 2,905,797 | 9/1959 | Guyer et al. | 219/10.69 X |
| 3,538,583 | 11/1970 | Galockin et al. | 29/790 X |
| 4,116,375 | 9/1978 | Mozzhukhin | 228/48 |
| 4,144,432 | 3/1979 | Mozzhukhin et al. | 219/10.57 X |
| 4,214,139 | 7/1980 | Kozlov et al. | 219/10.69 X |

FOREIGN PATENT DOCUMENTS 1574295  9/1980  United Kingdom.

*Primary Examiner*—B. A. Reynolds
*Assistant Examiner*—Philip H. Leung
*Attorney, Agent, or Firm*—Lilling & Greenspan

[57] ABSTRACT

An apparatus for delivering valves and melting rings for internal combustion engines to an inductor heater for hard facing comprises a tubular body which is adjoined by gravity feed trays, for feeding the work valves and rings to be melted respectively. A rotatable pocket is mounted between the tubular body and the tray for feeding the rings. The work valve and the ring to be melted are fed to the tubular body by gravity. Interaction with a stop mounted on the tubular body causes the valve to fall inside the tubular body with its stem being upwardly directed. After rotating, the pocket puts the ring to be melted onto the valve stem. The valve with the ring put thereupon is placed into the inductor for melting.

4 Claims, 7 Drawing Figures

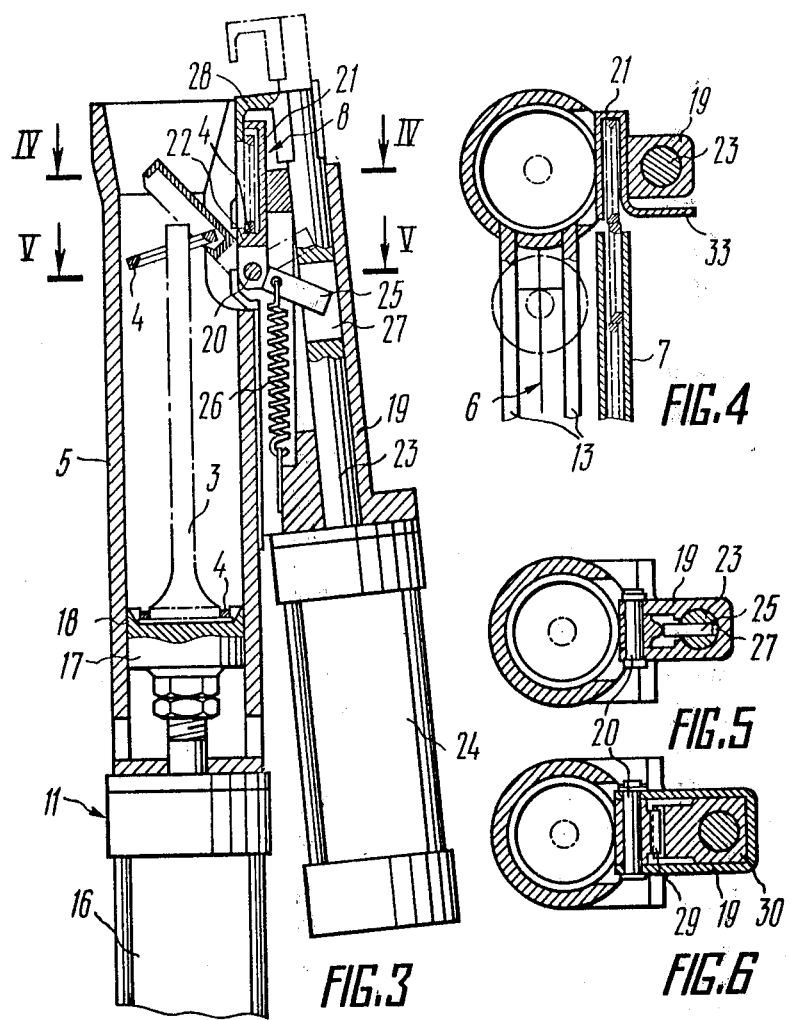

APPARATUS FOR DELIVERY OF VALVES AND MELTING RINGS TO AN INDUCTOR HEATER FOR HARD FACING

BACKGROUND OF THE INVENTION

1. Field of the Invention

The present invention relates to welding apparatuses using induction heating, wherein work pieces to be welded are previously positioned for welding. More particularly, the invention relates to apparatuses for hard facing of valves for internal combustion engines by melting rings of heat-resistant alloys upon the working surface of the valves.

The term "working surface" is used to denote a chamfer made in the valve head of an internal combustion engine and adapted to provide for a close fitting between the valve and the respective seat chamfer.

Most efficiently the invention can be employed at enterprises engaged in serial production of valves for internal combustion engines.

2. Description of the Prior Art

It is known that to effect hard facing of a valve, an alloy ring is set on the head thereof, the valve is put in a vertical position and the valve head with the ring set thereupon is placed into a high-temperature heater, for instance in a high-frequency inductor.

At present, valves are hard-faced with the aid of devices wherein fitting a ring onto the valve head, positioning the valve in a vertical alignment and feeding the valve into the inductor are effected by mechanical means, for instance a manipulator.

Despite the automation of the hard facing process, there still remain possibilites to increase the efficiency of the above devices by shortening the time for assembling the work valve with the ring, as well as by carrying out the above assembling at a time when the previous valve is being treated.

Known in the art is an apparatus, for hard facing of valves for internal combustion engines, having an assembling means (for fitting the ring onto the valve) made in the form of a vertically positioned tubular body adjoined by gravity feed trays for feeding the work valves and the rings to be melted to the tubular body.

Assembling the work valve with the ring is effected in the above apparatus by gravity. Hence, the means is simple in design and more efficient as compared with similar means wherein the assembling is performed by a number of mechanisms.

Despite obvious advantages, said means is not reliable enough in operation because sometimes the ring may fall wide of the valve stem, or else the valve itself falls at a moment when it is being placed under the inductor. Naturally, it requires constant control and interference on the part of the operator.

Also known in the art is an apparatus for hard facing of valves for internal combustion engines comprising a means for assembling the work valve with the ring to be melted (cf. Laid-open Swedish Application No. 7802954-3; British Pat. No. 1,574,295), comprising a vertically positioned tubular body adjoined by gravity feed trays, for feeding the work valves and the rings respectively, a receiver for receiving the ring and putting it into the valve stem, located under the tray for feeding the valves and intended for positioning the valve so that its stem is directed upward, and a pusher located under the tubular body and adapted for feeding the valve with the ring fitted upon its head into the inductor, and a mechanism for holding the valve therein.

For placing the valves inside the tubular body, in the wall thereof there is provided a hole adjoined by the tray for feeding the rings to be melted; the receiver for receiving the rings is a plate inserted into the slot provided in the tubular body below the hole for placing the rings therein. The curtain is connected with a drive providing for its reciprocating movement.

The pusher for feeding the rings is mounted on a slide and has a socket to accommodate the valve with the ring put thereupon, the pusher slide being connected with a reciprocating drive for alternately placing the pusher under the tubular body or the inductor.

The tray for feeding the rings has a complicated form providing for a vertical position of the rings at the entry side of the tray and a horizontal position at the exit side thereof. A separator for feeding the rings by the piece from a storage is mounted at the entry side of the ring feeding tray.

To feed the rings with a right side turned in the direction of movement, i.e., to prevent the ring from turning over, there is provided another plate inserted into the slot made in the tubular body above the aforementioned hole.

Despite the reliability achieved, the complicated form of the tray for feeding the rings, the arrangement of the pusher on the slide connected with drives, and the necessity of machining the tubular body to have various entries and exits for the valves and rings complicate the design and hence the manufacturing process of the above apparatus.

In addition, the time required for moving the pusher under the heater and then back under the tubular body restricts the efficiency of the above apparatus.

OBJECT OF THE INVENTION

The object of the invention is to remove these disadvantages.

The main object of the invention is to provide an apparatus for hard facing of valves for internal combustion engines with a gravity feed of the valves and the rings, which is reliable in operation and simple in construction, and which is achieved by the receiver for receiving the rings being adapted both for feeding the rings by the piece and for putting the rings onto the stem of the valve being in a vertical position within the tubular body.

The main object of the invention is to provide an apparatus for hard facing of valves for internal combustion engines which is reliable in operation.

Another object of the invention is to provide an apparatus for hard facing of valves for internal combustion engines which is simple in construction.

More specifically, the object of the invention is to provide an apparatus for hard facing of valves for internal combustion engines with a gravity feed of the work valve and the ring to be melted, which is reliable in operation and simple in construction due to the presence of a means adapted both for feeding rings by the piece from the tray and for placing these rings into the tubular body and putting them upon the work valves.

A further object of the invention is to provide an apparatus for hard facing of valves for internal combustion engines which having a simple and reliable construction is highly efficient.

SUMMARY OF THE INVENTION

These and other objects are attained by an apparatus for hard facing of valves for internal combustion engines by melting rings upon the working surface of valves, comprising an inductor under which there is mounted an assembly means for assembling a work valve and a ring to be melted. The assembly means has a vertically installed tubular body adjoined by gravity feed trays for feeding a work valve and a ring respectively, a stop located under the tray for feeding the rings and adapted for positioning the valve so that its stem is upwardly directed, a receiver for receiving and conveying the rings to be melted inside the tubular body, a pusher located under the tubular body for conveying the valve with the ring fitted thereupon into the inductor, and a fixing mechanism for holding the valve within the inductor. According to the invention, the tubular body is installed immediately under the inductor; and the receiver for receiving the rings is directly adjoined by the tray for feeding the rings and made in the form of a rotatable pocket mounted on an axle and having in its lower part a shelf for holding the ring, the pocket being connected through a transmitting link to an actuating cylinder providing for rotation.

Such an embodiment of the apparatus for hard facing of valves for internal combustion engines makes it possible for the rotatable pocket to perform the function of a separator and, at the same time, to put the ring onto the valve stem and place them inside the tubular body, thereby combining the functions of a separator and a receiver.

In addition, feeding the rings inside the tubular body through the upper end thereof makes it unnecessary to make various holes, slots, openings, etc. in the tubular body, which simplifies the manufacturing process of said apparatus.

It is expedient that the transmitting link connecting the rotatable pocket with the actuating cylinder (pneumatic or hydraulic cylinder) be formed by a spring-controlled lever attached to the back side of the rotatable pocket and inserted into a slot made in the rod of the actuating cylinder.

Such an embodiment of the transmitting link is simple in design and easy to manufacture.

It is possible that the transmitting link connecting the rotatable pocket with the actuating cylinder be formed by a toothed sector mounted concentrically relative to the rotation axle thereof and meshed with a toothed rack mounted for axial movement along the rod of the actuating cylinder; the toothed rack is adjusted by a spring from above and its movement is limited by a stop from beneath made on the rod of the actuating cylinder.

Such an embodiment of the transmitting link considerably increases the reliability and service life thereof, though it complicates its design to a certain extent. In this case sliding friction is ruled out, thereby reducing the wear of the transmitting link friction elements.

It is expedient that a II-shaped cap be mounted on the end of the actuating cylinder. This will provide for closing the upper side of the pocket at the moment when the pocket receives the ring to be melted.

BRIEF DESCRIPTION OF THE DRAWINGS

The above-mentioned and other objects will become more apparent from the following description of embodiments of the invention taken in conjunction with the accompanying drawings wherein corresponding parts are identified by corresponding reference numerals and in which:

FIG. 3 is a cross sectional view along line III—III of FIG. 1 showing an embodiment of the transmitting link connecting the rotatable pocket to the rod of the actuating cylinder;

FIG. 4 is a cross sectional 16 and 18, view along line IV—IV of FIG. 3, showing the arrangement of the rotatable pocket and the tubular body with respect to each other;

FIG. 5 is a cross section along line V—V of FIG. 3, showing the transmitting link in FIG. 3; and FIG. 6 is a cross section along line VI—VI of FIG. 3a showing the transmitting link in FIG. 3a.

DETAILED DESCRIPTION OF THE INVENTION

Figure 1:
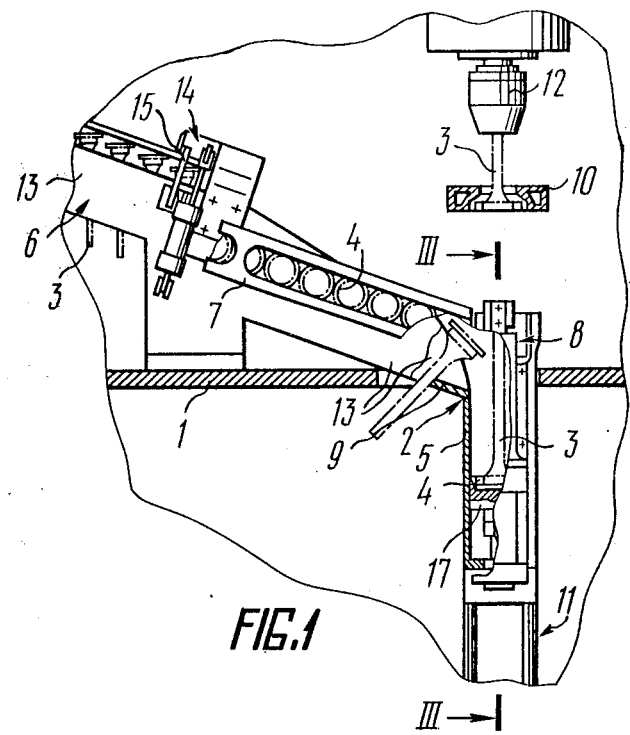
FIG. 1 is a side view, partly broken away, of the apparatus for hard facing of valves for internal combustion engines according to the invention.

An apparatus for hard facing of valves for internal combustion engines comprises a bed 1 (FIG. 1).

Figure 2:
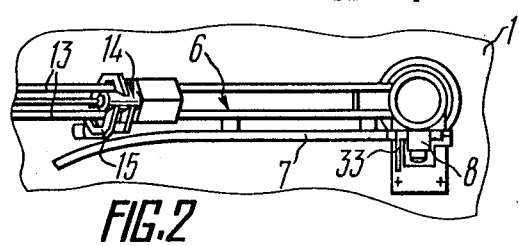
FIG. 2 is a top view of FIG. 1, with the inductor and the chuck not shown.

Mounted on the bed 1 (FIGS. 1 and 2) is an assembly means 2 for assembling a work valve 3 with a ring 4 to be melted. The assembly means has a vertically positioned tubular body 5 adjoined by gravity feed trays 6 and 7 for feeding the work valve 3 and the ring 4 to the tubular body 5 respectively. To place the ring 4 inside the tubular body 5 the assembly means is provided with a receiver 8 for receiving the rings; for positioning the valve into the tubular body 5 with its stem being upwardly directed, the tubular body 5 is provided with a stop 9.

Also mounted on the bed 1 (FIG. 1) is a heater made in the form of a high-frequency inductor 10, a pusher 11 for feeding the valve into the inductor, and a fixing mechanism 12 for fixing the valve within the inductor. The pusher 11 and the tubular body 5 are located immediately under the inductor 10, and the fixing mechanism is above the inductor 10.

The tray 6 is formed by two parallel guiding plates 13 mounted at an angle to a horizontal plane so as to enable a gravity feed of the valves. On the tray 6 there is mounted a separating device 14 for separating out one valve from other valves on the tray 6. The device 14 is a separator comprising a rocker 15 mounted on an axle and linked with a drive (not shown) providing for oscillation movement thereof.

The tray 7 has the form of a box elongated in cross-section in a vertical direction so that it corresponds to the form of the ring. To make the rolling of the rings possible the tray 7 is inclined. Near the tubular body 5 the tray adjoins the receiver 8 for receiving the ring 4.

Figure 3A:
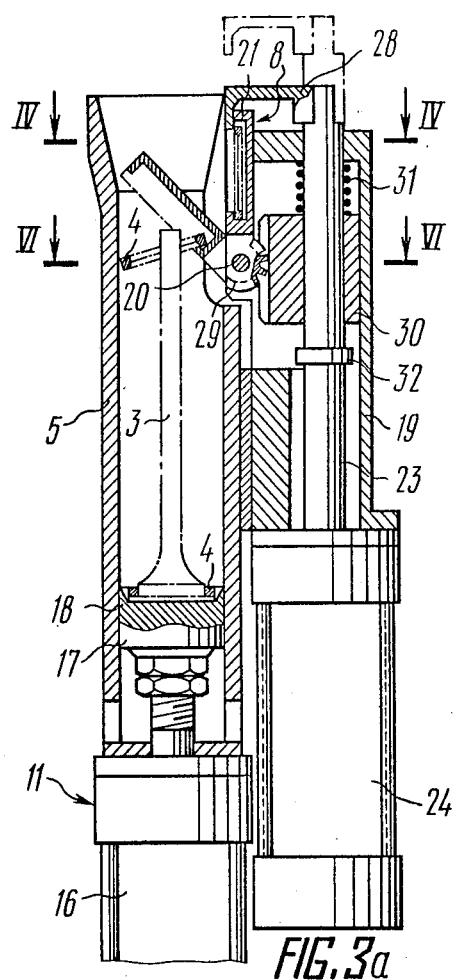
FIG. 3a is a view similar to FIG. 3 but showing an alternative embodiment of the transmitting link connecting the rotatable pocket with the actuating cylinder.

The pusher 11 (FIGS. 1 and 3) for placing the valve 3 with the ring 4 into the inductor 10 is an air-operated cylinder 16 on the rod of which there is mounted a plate 17 with a circular conical fillet 18. The plate 17 is inserted into the tubular body 5 and adapted to receive the valve 3 conveyed in a head-down position.

The fixing mechanism 12 for holding the valve is made as a jaw chuck (FIG. 1).

The receiver 8 (FIG. 3) for receiving the ring 4 to be melted is mounted on a bracket 19 adjoining the tubular body 5.

According to the invention, the receiver 8 is located between the upper end of the tubular body 5 and the tray 7 for feeding the rings 4, the receiver 8 being made in the form of a rotatable pocket 21 fitted on an axle 20 and having at least in the lower part a shelf 22 for holding the ring. Through a transmitting link the rotatable pocket 21 is connected with the rod 23 of an actuating cylinder 24 (air-operated pneumatic or hydraulic cylinder) mounted on the bracket 19.

According to one embodiment of the invention, the transmitting link (FIGS. 3,5) connecting the rotatable pocket 21 with the rod 23 of the actuating cylinder 24 is a lever 25 attached to the back side of the rotatable pocket 21 at the lower part thereof. The lever 25 is pressed downward by a spring 26, with its end being inserted into a longitudinal slot 27 made in the rod 23 of the actuating cylinder 24.

An II-shaped cap 28 intended for holding the upper part of the ring 4 is attached to the end of the rod 23 (FIGS. 3 and 3a) of the actuating cylinder 24.

According to another embodiment of the invention, the transmitting link connecting the rotatable pocket 21 with the rod 23 of the actuating cylinder 24 is formed by a toothed sector 29, made in the lower part of said pocket concentrically to the rotation axle 20 thereof, and by a toothed rack 30 fitted loosely on the rod 23 of the actuating cylinder 24 for axial movement and pressed downwardly by a spring 31. To limit the rack 30 movement down along the rod 30 provided a fillet 32 is provided.

The rotatable pocket 21 has a plate 33 adapted to close the exit of the tray 7 during the pocket 21 rotation at the moment when the ring 4 is being conveyed into the tubular body 5.

The apparatus for hard facing of valves for internal combustion engines is provided with a control system which is not shown nor described in order to make the invention more understandable. It is apparent to those skilled in the art that the above system may employ various automation means known in the art.

The operation of the above apparatus for hard facing of valves for internal combustion engines is as follows.

In response to the command for feeding one work valve the rocker 15 begins to oscillate, with one of its arms releasing the valve 3, and the other arm closing the tray 6, thereby preventing the rest of the valves from advancing. The valve 3 moves by gravity along the tray 6 towards the tubular body 5. On reaching the tubular body 5 and striking its stem against the stop 9, the work valve 3 turns with its head down and falls inside the tubular body 5. Inside the tubular body 5, resting with its head upon the plate 17, the valve 3 assumes a vertical position, whereafter there follows a command for the work ring to be put upon the valve stem.

According to the first embodiment of the invention (FIG. 3), in response to this command the air-operated cylinder 24 operates and its rod 23 moves upwards. As the rod 23 begins moving, the cap 28 also moves up and opens the upper side of the rotatable pocket 21. The lower side of the slot 27 reaches the lever 25, and the rod 23 overcoming the force of the spring 26 rotates the pocket 21.

The work ring 4 in the rotatable pocket 21 falls inside the tubular body 5 and gets fitted onto the stem of the valve 3. On lying down upon the valve 3 head, the work ring 4 is adjusted by the conical fillet 18 of the plate 17 so as to assume the position in which it will be melted. Concurrently with the ring feeding, i.e. during rotation of the pocket 21, the plate 33 closes the tray 7, thereby preventing the rings in the tray 7 from moving.

As the rod 23 moves downwards, the rotatable pocket 21 returns to its initial position under the action of the spring 26. The cap 28 goes down and closes the upper part of the rotatable pocket 21. After the rotatable pocket 21 is set in its initial position, the plate 33 opens the tray 7 and the row of the rings 4 moves down along the tray 7, to thereby feed the next work ring into the rotatable pocket 21.

According to another embodiment of the invention, the pocket 21 rotation is effected in the following manner.

In response to the command for putting the work ring onto the valve stem, the air-operated cylinder 24 operates. As the rod begins to move upwards, the cap 28, also moving up, opens the upper part of the rotatable pocket 21. The fillet 32 of the rod 23 presses against the toothed rack 30 and overcoming the spring 31 force, lifts the rack 30 which, in turn, rotates the pocket 21 through the sector 29. The work ring 4 in the rotatable pocket falls inside the tubular body 5 and gets fitted onto the valve 3 stem. On lying down upon the valve 3 head, the ring 4 is adjusted by the conical fillet 18 of the plate 17 so as to assume the position in which it will be melted. Concurrently with the ring feeding, i.e. during the rotation of the pocket 21, the plate 33 closes the tray 7 thereby preventing the rings in the tray 7 from moving.

As the rod 23 of the air-operated cylinder 24 moves down, the rotatable pocket 21 returns to its initial position under the action of the spring 31 so that it presses against the upper part of the bracket 19. Under the action of the spring 31 the rack 30 stops moving and, resting against the teeth of the toothed sector 29 of the pocket 21, assumes its initial position, the rod 23, at the same time, continues its downward movement.

The fillet 32 gets detached from the rack 30, the cap 28 goes down, the plate 33 opens the tray 7 and the row of the work rings 4 moves down until the next ring enters the rotatable pocket 21.

Both with the first and second embodiments of the invention, the cycle is continued after the ring 4 to be melted is put onto the valve 3 head. Thereafter, in response to the command for feeding the work valve with the ring put thereupon into the inductor 10, the air-operated cylinder 16 operates and the plate 17 moved upward by the rod delivers the valve 3 with the ring 4 placed thereupon to the inductor 10 and to the clamping chuck 12. As the end of the valve 3 stem reaches (FIG. 1) the hole of the clamping chuck 12, and the valve 3 head reaches the inductor 10, the end of the valve 3 stem presses an end switch (not shown) located in the hole of the chuck 12.

Then, commands from the control system are given for clamping and rotating the chuck 12, for energizing the inductor 10, and for moving the plate 17 downward by the air-operated cylinder 16.

The ring 4 is melted down by a high-frequency current field and fuses with the head of the valve 3 rotated by the chuck 12 to provide for a uniform spreading of the metal on the valve working surface.

On the commands from the control system the next work valve and the ring to be melted are fed into the tubular body 5.

After the work ring is melted upon the valve head, the chuck 12 is unclamped and the next valve is fed into the inductor 10.

While particular embodiments of the invention have been shown and described, various modifications thereof will be apparent to those skilled in the art, and therefore it is not intended that the invention be limited to the disclosed embodiments or to the details thereof and departures may be made therefrom within the spirit and scope thereof as defined in the claims.

We claim:

1. An apparatus for delivery of valves and melting rings for internal combustion engines to an inductor heater, for hard facing of said valves by melting said melting rings upon the working surfaces of said valves, comprising:
   a vertically installed tubular body arranged under said inductor heater;
   first and second gravity feed trays adjoining an upper end of said tubular body for respectively feeding valves and rings to said tubular body;
   a stop located under said first tray and positioning a respective valve so that a stem of said respective valve is upwardly directed;
   a rotatable pocket receiving a respective work ring and setting it onto said respective valve, said pocket having a rotation axle and being located between said tubular body and said second tray and having a shelf in a lower part for holding the ring;
   an actuating cylinder means to rotate said pocket;
   a transmitting link connecting a rod of said actuating cylinder means to said pocket for rotating said pocket to feed said respective ring onto said respective valve; and
   a pusher having a plate located inside said tubular body to receive the valve with the ring set thereupon and to convey it into said inductor.

2. An apparatus according to claim 1, wherein said transmitting link comprises a spring-controlled lever attached to a back wall of said pocket and inserted into a slot made in the rod of said actuating cylinder.

3. An apparatus according to claim 1, wherein said transmitting link comprises a toothed sector located on said pocket concentrically relative to the rotation axle thereof and meshed with a toothed rack loosely set on the rod of said actuating cylinder for axial movement, said toothed rack being spring-loaded and interacting with a fillet made on the rod of said actuating cylinder for rotating said pocket.

4. An apparatus according to claim 1, wherein on the end of the rod of said actuating cylinder there is a II-shaped cap for closing an upper side of said pocket at the moment whe the pocket receives the ring to be melted.

* * * * *